United States Patent
Lebrun et al.

(10) Patent No.: US 10,740,886 B1
(45) Date of Patent: Aug. 11, 2020

(54) SYSTEMS AND METHODS FOR SCORING IMAGES

(71) Applicant: GoPro, Inc., San Mateo, CA (US)

(72) Inventors: Marc Lebrun, Issy-les-Moulineaux (FR); Benjamin Carpentier, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 101 days.

(21) Appl. No.: 16/201,444

(22) Filed: Nov. 27, 2018

(51) Int. Cl.
*G06T 7/00* (2017.01)
*G06T 7/90* (2017.01)
*G06T 7/11* (2017.01)

(52) U.S. Cl.
CPC .............. *G06T 7/0002* (2013.01); *G06T 7/11* (2017.01); *G06T 7/90* (2017.01); *G06T 2207/10024* (2013.01); *G06T 2207/30168* (2013.01)

(58) Field of Classification Search
CPC .. G06K 9/0061; G06K 9/4652; G06K 9/6202; G06K 9/6212; G06K 9/4609; G06K 9/6277; G06K 9/00228; G06K 9/52; G06K 9/68; H04N 1/62; H04N 1/624; H04N 1/32144; H04N 1/32251; H04N 1/32309; H04N 21/4728; H04N 19/176; G06T 2207/10024; G06T 7/11; G06T 7/90; G06T 7/0002; G06T 7/187; G06T 7/73; G06T 7/0012; G06T 11/001; G06T 7/60; G09G 2300/0452; G09G 2320/0666; G09G 2340/06; G09G 2340/16; G09G 3/2003; G09G 2320/066; G02F 2/133514; G06N 3/08

USPC .............. 382/162, 164, 165, 170, 171, 173; 345/83, 596, 698
See application file for complete search history.

(56) References Cited

U.S. PATENT DOCUMENTS

| | | | |
|---|---|---|---|
| 5,734,744 A * | 3/1998 | Wittenstein | H04N 19/503 375/E7.14 |
| 9,299,009 B1 * | 3/2016 | Arora | G06F 3/0482 |
| 2003/0085906 A1 * | 5/2003 | Elliott | G09G 3/20 345/613 |
| 2003/0202105 A1 * | 10/2003 | Gaubatz | G06K 9/0061 348/207.99 |
| 2004/0109611 A1 * | 6/2004 | Perlmutter | G06T 7/12 382/254 |
| 2004/0183817 A1 * | 9/2004 | Kaasila | G06F 16/9577 345/660 |
| 2005/0238228 A1 * | 10/2005 | Platt | G09G 5/005 382/162 |
| 2008/0052638 A1 * | 2/2008 | Frank | G06K 9/00476 715/808 |
| 2008/0059452 A1 * | 3/2008 | Frank | G06F 16/954 |
| 2008/0247647 A1 * | 10/2008 | King | G06K 9/38 382/173 |
| 2009/0080773 A1 * | 3/2009 | Shaw | G06T 7/41 382/173 |
| 2010/0013748 A1 * | 1/2010 | Cok | H04N 9/67 345/83 |
| 2013/0342671 A1 * | 12/2013 | Hummel | G06F 3/011 348/77 |

(Continued)

*Primary Examiner* — Aklilu K Woldemariam
(74) *Attorney, Agent, or Firm* — Esplin & Associates, PC

(57) ABSTRACT

An image may include depictions of different parts of a scene, such as the ground, the sky, and objects between the ground and the sky. The image may be divided into multiple bands, and the image may be scored based on colors of pixels within different bands of the image.

20 Claims, 11 Drawing Sheets

(56) References Cited

U.S. PATENT DOCUMENTS

| | | | |
|---|---|---|---|
| 2015/0103094 A1* | 4/2015 | Xue | G06T 11/001 |
| | | | 345/596 |
| 2016/0148386 A1* | 5/2016 | Seifi | G06T 7/60 |
| | | | 348/222.1 |
| 2016/0187199 A1* | 6/2016 | Brunk | G06K 9/2036 |
| | | | 348/89 |
| 2016/0255356 A1* | 9/2016 | Strom | H04N 19/103 |
| | | | 375/240.08 |
| 2017/0104976 A1* | 4/2017 | Bishop | H04N 13/161 |
| 2017/0213112 A1* | 7/2017 | Sachs | G06T 7/90 |
| 2017/0256035 A1* | 9/2017 | Takatori | G06K 9/4604 |

* cited by examiner image 600

Top

Middle

Bottom image 650

Top

Middle

Bottom

SYSTEMS AND METHODS FOR SCORING IMAGES

FIELD

This disclosure relates to scoring images using multiple bands within the images.

BACKGROUND

A user may capture a number of images. Manually reviewing the images to score the images may be time consuming. For example, manually reviewing the images to determine which of the images are most/more visually pleasing may be time consuming.

SUMMARY

This disclosure relates to scoring images. Image information defining an image and/or other information may be obtained. The image may include visual content. The visual content may include pixels with colors defined by values of multiple channels. The image may be segmented into multiple bands. The bands may include a first band, a second band, a third band, and/or other bands. The second band may be located between the first band and the third band. A set of color metric values of multiple metrics may be determined for individual bands based on the values of the multiple channels of the pixels within the individual bands. A first set of color metric values may be determined for the first band based on the values of the multiple channels of the pixels within the first band. A second set of color metric values may be determined for the second band based on the values of the multiple channels of the pixels within the second band. A third set of color metric values may be determined for the third band based on the values of the multiple channels of the pixels within the third band.

A ratio of one or more values of the second set of color metric values to one or more values of the first set of color metric values or to one or more values of the third set of color metric values may be determined. A score for the image may be determined based on the ratio, a first comparison of one or more values of the first set of color metric values to one or more values of the third set of color metric values, a second comparison of one or more values of the second set of color metric values to one or more values of the first set of color metric values or to one or more values of the third set of color metric values, and/or other information.

A system that scores images may include one or more electronic storage, processor and/or other components. The electronic storage may store image information defining images, information relating to images, information relating to bands within images, information relating to color metrics, information relating to ratios of values of color metrics, information relating to scores for images, and/or other information.

The processor(s) may be configured by machine-readable instructions. Executing the machine-readable instructions may cause the processor(s) to facilitate scoring images. The machine-readable instructions may include one or more computer program components. The computer program components may include one or more of an image information component, a segment component, a metric component, a ratio component, a score component, and/or other computer program components.

The image information component may be configured to obtain image information and/or other information. Image information may define an image. The image may include visual content. The visual content may include pixels with colors defined by values of multiple channels. The image information component may obtain image information from one or more storage locations. The image information component may obtain image information during acquisition of the image and/or after acquisition of the image by one or more image capture devices.

In some implementations, analysis of the image may be performed on a lower-resolution thumbnail of the image. In some implementations, one or more of an auto white balance, a color matrix, and/or a tone curve may be applied to the lower-resolution thumbnail to accentuate color discrimination within the lower-resolution thumbnail The segment component may be configured to segment the image into bands. The bands may include a first band, a second band, a third band, and/or other bands. The second band may be located between the first band and the third band. In some implementations, first band may be a top band, the second band may be a middle band, and the third band may be a bottom band.

The metric component may be configured to determine a set of color metric values of multiple metrics for individual bands based on the values of the multiple channels of the pixels within the individual bands and/or other information. A first set of color metric values may be determined for the first band based on the values of the multiple channels of the pixels within the first band and/or other information. A second set of color metric values may be determined for the second band based on the values of the multiple channels of the pixels within the second band and/or other information. A third set of color metric values may be determined for the third band based on the values of the multiple channels of the pixels within the third band and/or other information.

In some implementations, the multiple channels may include a hue channel, a saturation channel, and/or other channels.

In some implementations, the set of color metrics values may be determined based on means of trimmed values of one or more of the multiple channels of the pixels within the individual bands. The trimmed values may be determined based on removal of lowest 10% and highest 10% of the values and/or other information.

The ratio component may be configured to determine a ratio of one or more values of the second set of color metric values to one or more values of the first set of color metric values or to one or more values of the third set of color metric values. In some implementations, the ratio of one or more values of the second set of color metric values to one or more values of the first set of color metric values or to one or more values of the third set of color metric values may be determined as a minimum of (1) a first ratio of a standard deviation of the one or more values of the second set of color metric values to the one or more values of the first set of color metric values and (2) a second ratio of a standard deviation of the one or more values of the second set of color metric values to the one or more values of the third set of color metric values.

The score component may be configured to determine a score for the image based on the ratio, a first comparison of one or more values of the first set of color metric values to one or more values of the third set of color metric values, a second comparison of one or more values of the second set of color metric values to one or more values of the first set of color metric values or to one or more values of the third set of color metric values, and/or other information. In some implementations, the score may be modified based on a tilt of visual content within the image.

In some implementations, the score may characterize inclusion of a depiction of a sky within the top band, inclusion of a depiction of a ground within the bottom band, and inclusion of a depiction of one or more objects between the ground and the sky within the middle band.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
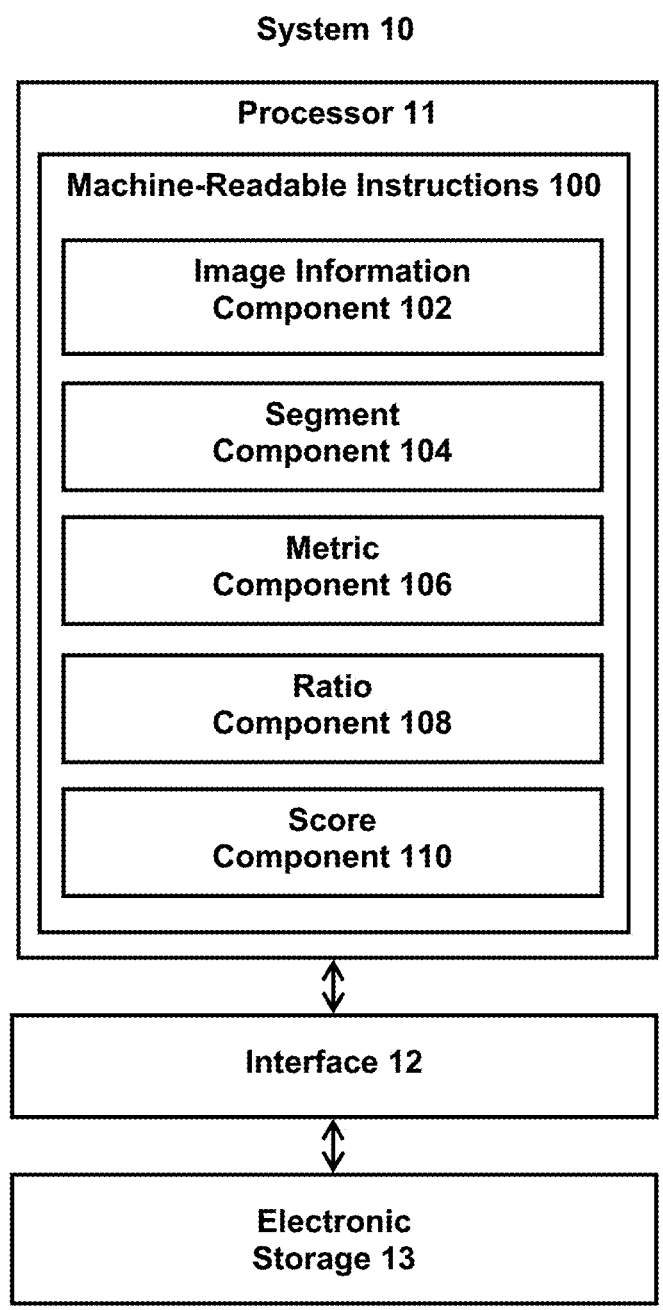
FIG. 1 illustrates a system that scores images.

FIG. 1 illustrates a system 10 for scoring images. The system 10 may include one or more of a processor 11, an interface 12 (e.g., bus, connection, wireless interface), an electronic storage 13, and/or other components. Image information defining an image and/or other information may be obtained by the processor 11. The image may include visual content. The visual content may include pixels with colors defined by values of multiple channels. The image may be segmented into multiple bands. The bands may include a first band, a second band, a third band, and/or other bands. The second band may be located between the first band and the third band. A set of color metric values of multiple metrics may be determined for individual bands based on the values of the multiple channels of the pixels within the individual bands. A first set of color metric values may be determined for the first band based on the values of the multiple channels of the pixels within the first band. A second set of color metric values may be determined for the second band based on the values of the multiple channels of the pixels within the second band. A third set of color metric values may be determined for the third band based on the values of the multiple channels of the pixels within the third band.

A ratio of one or more values of the second set of color metric values to one or more values of the first set of color metric values or to one or more values of the third set of color metric values may be determined. A score for the image may be determined based on the ratio, a first comparison of one or more values of the first set of color metric values to one or more values of the third set of color metric values, a second comparison of one or more values of the second set of color metric values to one or more values of the first set of color metric values or to one or more values of the third set of color metric values, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store image information defining images, information relating to images, information relating to bands within images, information relating to color metrics, information relating to ratios of values of color metrics, information relating to scores for images, and/or other information.

An image may include content captured by a single image capture device (e.g., image sensor, camera) or multiple image capture devices, and/or one or more other capture devices (e.g., sound sensor, microphone). An image including content captured by multiple capture devices may include content captured at the same location(s), content captured at different locations, content captured at the same time(s), and/or content captured at different times. An image may include edited content. For example, an image may include content of one or more other images that have been edited into an edited image.

An image may include visual content. Visual content may refer to content of one or more images that may be consumed visually. For example, visual content may be included within one or more image and/or one or more video frames of a video. An image may include a standalone image and/or a video frame of a video at one or more moments within a progress length of the video. Visual content may be generated based on light received within a field of view of a single image sensor or within fields of view of multiple image sensors during a capture period.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate scoring images. The machine-readable instructions 100 may include one or more computer program components. The machine-readable instructions 100 may include one or more of an image information component 102, a segment component 104, a metric component 106, a ratio component 108, a score component 110, and/or other computer program components.

The image information component 102 may be configured to obtain image information and/or other information. Obtaining image information may include one or more of accessing, acquiring, analyzing, determining, examining, identifying, loading, locating, opening, receiving, retrieving, reviewing, storing, and/or otherwise obtaining the image information. The image information component 102 may obtain image information from one or more locations. For example, the image information component 102 may obtain image information from a storage location, such as the electronic storage 13, electronic storage of information and/or signals generated by one or more image sensors, electronic storage of a device accessible via a network, and/or other locations. The image information component 102 may obtain image information from one or more hardware components (e.g., an image sensor) and/or one or more software components (e.g., software running on a computing device).

The image information component 102 may be configured to obtain image information defining an image during acquisition of the image and/or after acquisition of the image by one or more image sensors/image capture devices. For example, the image information component 102 may obtain image information defining an image while the image is being captured by one or more image sensors/image capture devices. The image information component 102 may obtain image information defining an image after the image has been captured and stored in memory (e.g., the electronic storage 13).

In some implementations, the image information may be obtained based on user interaction with a user interface/application (e.g., image/video application), and/or other information. For example, a user interface/application may provide option(s) for a user to select one or more images to be scored. The image information defining the image(s) may be obtained based on the user's selection of the image(s) (direct selection of image(s) and/or indirection selection of image(s) such as by selection of folder(s) containing the image(s) and/or selection of criteria for selecting image(s)) through the user interface/application.

Image information may define one or more images. Image information may be stored within a single file or multiple files. For example, image information defining an image may be stored within an image file, multiple image files, a combination of different files, and/or other files. Image information may be stored in one or more formats/container. A format may refer to one or more ways in which the information defining an image is arranged/laid out (e.g., file format). A container may refer to one or more ways in which information defining an image is arranged/laid out in association with other information (e.g., wrapper format).

An image may include visual content. The visual content may include pixels with colors defined by values of multiple channels. A pixel may represent a unit of an image that may be displayed and/or represented. Arrangement of pixels may form the visual content of the image. Individual pixels may be defined by values of one or more channels. A channel may store color information for one color component of a color space (color model, color system). For example, the visual content of an image may include pixels with colors defined by values of one or more of a red channel, a green channel, a blue channel (RGB color space), and/or other channels. The visual content of an image may include pixels with colors defined by values of one or more of a hue channel, a saturation channel, a value channel (HSV color space), and/or other channels. Use of other channels and/or color spaces are contemplated.

In some implementations, analysis of the image may be performed on a lower-resolution thumbnail of the image. Analysis of the image may include one or more uses of the image for scoring the image. For example, one or more of segmenting the image into bands, determining a set of color metric values, determining a ratio of color metric values, determining a score, and/or other analysis of the image may be performed on a lower-resolution thumbnail of the image. A thumbnail of the image may refer to a smaller image that represents the image. For example, the image may have a resolution of 4000 pixels by 3000 pixels (4000×3000), and the analysis of the image may be performed on a lower-resolution thumbnail of the image having a resolution of 40 pixels by 30 pixels (40×30). Other aspect ratios of the image and other scaling down of the image for the thumbnail are contemplated.

Use of lower-resolution thumbnails for image analysis may reduce the processing cost of the image analysis. For example, use of lower-resolution thumbnails for image analysis may reduce processing time, processing power, power/battery charge consumption, memory usage, and/or other processing cost of the image analysis.

In some implementations, image analysis may be performed using existing data for the image. For example, a set of color metric values may be determined using an RGB thumbnail provided by an auto white balance block of an image capture device.

In some implementations, one or more color space conversion may be applied to the image for analysis of the image. For example, RGB image/thumbnail may be obtained and a RGB to HSV color space conversion may be performed to determine one or more values of color metric. In some implementations, the hue of the HSV color space may be 360-cyclical and a 1-cyclical hue may be used for the analysis of the image. Other color space conversions are contemplated.

In some implementations, one or more of an auto white balance, a color matrix, and/or a tone curve may be applied to the lower-resolution thumbnail to accentuate color discrimination within the lower-resolution thumbnail. For example, a thumbnail of an image may be dark and it may be difficult to discriminate the colors over the reduced resolution (e.g., 40×30). Application of the auto white balance, the color matrix, and/or the tone curve may increase the distinction between the colors in the lower-resolution thumbnail.

The segment component 104 may be configured to segment the image into bands. A band may refer to a portion of the image. For example, a band of an image may refer to a strip (e.g., one or more columns, one or more rows) of pixels within the image. Segmenting the image into bands may include segmenting the image into bands of same shape and/or size. Segmenting the image into bands may include segmenting the image into bands of different shapes and/or sizes. Segmenting the image into bands may include one or more of analyzing different portions of the image as the bands within the image, determining the bands within the image, dividing the image into the bands, extracting different portions of the image as the bands within the image, identifying the bands within the image, locating the bands within the image, setting the bands within the image, and/or otherwise segmenting the image into bands.

Figure 3:
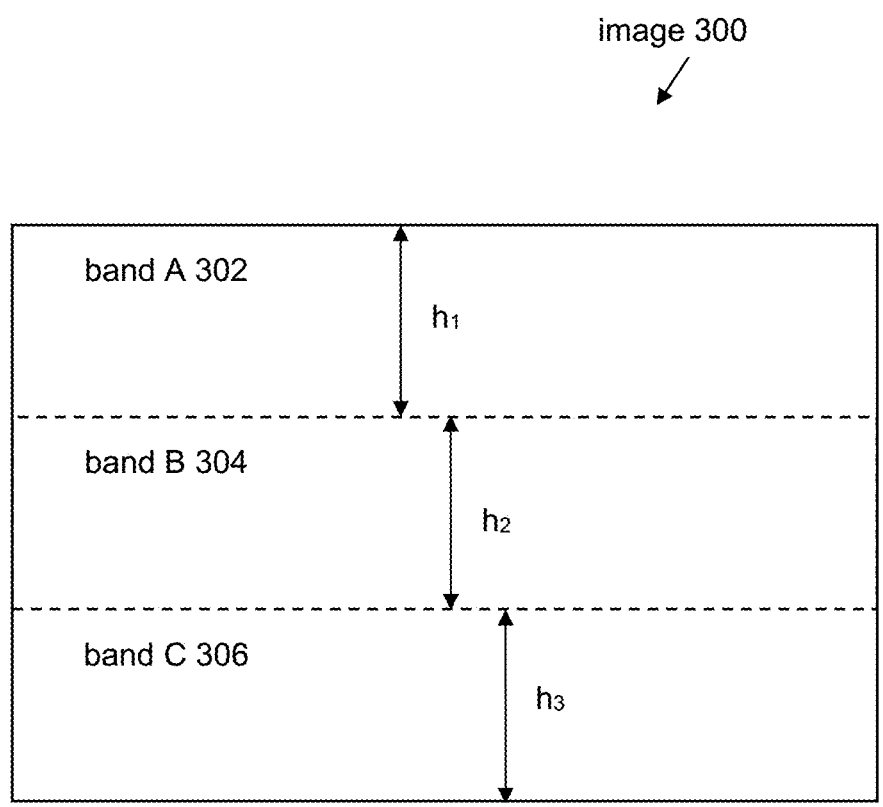
FIG. 3 illustrates example image segments.

FIG. 3 illustrates example image segments. FIG. 3 includes an image 300. The image 300 may be segmented into a band A 302, a band B 304, and a band C 306. Bands 302, 304, 306 may have the same shape and/or size or different shapes and/or sizes. For example, the band A 302 may have a height (number of pixels) of $h_1$, the band B 304 may have a height of $h_2$, and the band C 306 may have a height of $h_3$. The heights $h_1$, $h_2$, $h_3$ may be the same or different. The band B 304 may be located between the band A 302 and the band C 306. In FIG. 3, the band A 302 may be a top band, the band B 304 may be a middle band, and the band C 306 may be a bottom band. Other numbers of bands and other arrangements of bands are contemplated. For example, while the bands are organized in a top-down manner in FIG. 3, the bands may be organized in other ways, such as side-to-side, and the techniques disclosed herein may be applied to other arrangements of bands.

The segmentation of the image into bands may enable scoring of the image based on color characteristics of the pixels within individual bands. For example, the segmentation of the image into bands (e.g., such as shown in FIG. 3), may enable scoring of the image based on the rule of thirds. The rule of thirds may refer to a quality measure in photography, where images that respect the rule may be more pleasant to view than images that do not. For example, under the rule of thirds, an image that depicts a horizon that is located at a horizontal line dividing the lower one-third of the image from the upper two-thirds of the image (on the boundary of the bands B 304 and the band C 306 where $h_1=h_2=h_3$) may be more pleasant to view than an image that depicts a horizon at other locations.

Identification of the horizon location may be determine based on one or more color parameters/characteristics of the pixels within the image. A color parameter/characteristic may refer to one or more of feature, quality, quantity, trait, property, value, measurable factor, and/or other information relating to color. A color parameter/characteristic may be associated with one or more channels. For example, a color parameter/characteristic may characterize and/or be based on values of one or more channels. For example, FIGS. 4A-4D illustrate determination of whether the images respect the rule of thirds based on means of hue of pixels within the images. In FIGS. 4A-4D, the horizon may exist along the boundary between lighter portion of the image and the darker portions of the image. An image that respects the rule of third may have a larger difference in hue means between the lower one-third of the image and the upper two-thirds of the image. Use of other color parameters/characteristics (values of other channels) are contemplated.

Figure 4A:
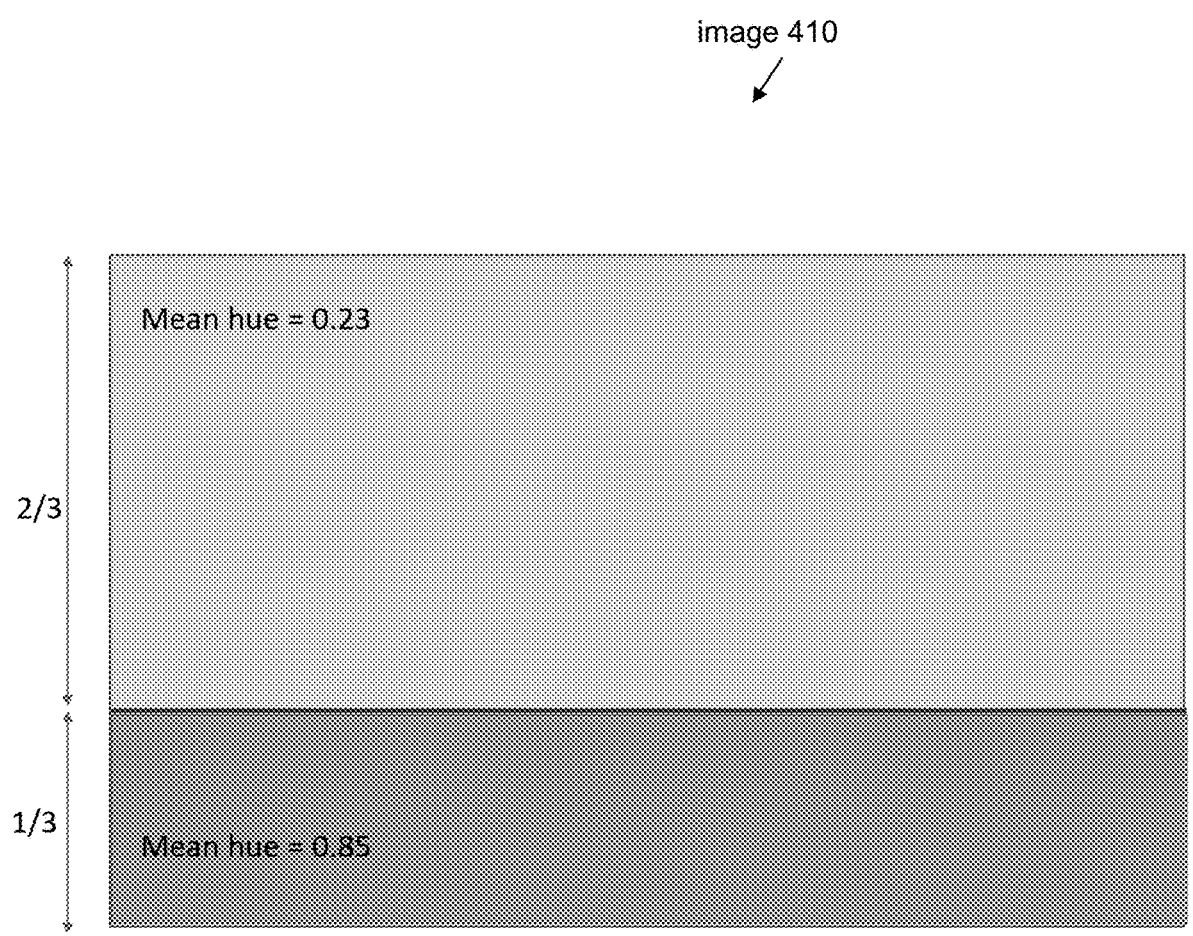
FIGS. 4A-4D illustrate example means of hue within images.

For example, FIG. 4A may show a horizon located at a horizontal line dividing the lower one-third of an image 410 from the upper two-thirds of the image 410. The image 410 may have a mean hue of 0.23 in the upper two-thirds of the image 410 and a mean hue of 0.85 in the lower one-third of the image 410. The difference of hue means may be 0.38 (because hue is 1-cyclical).

Figure 4B:
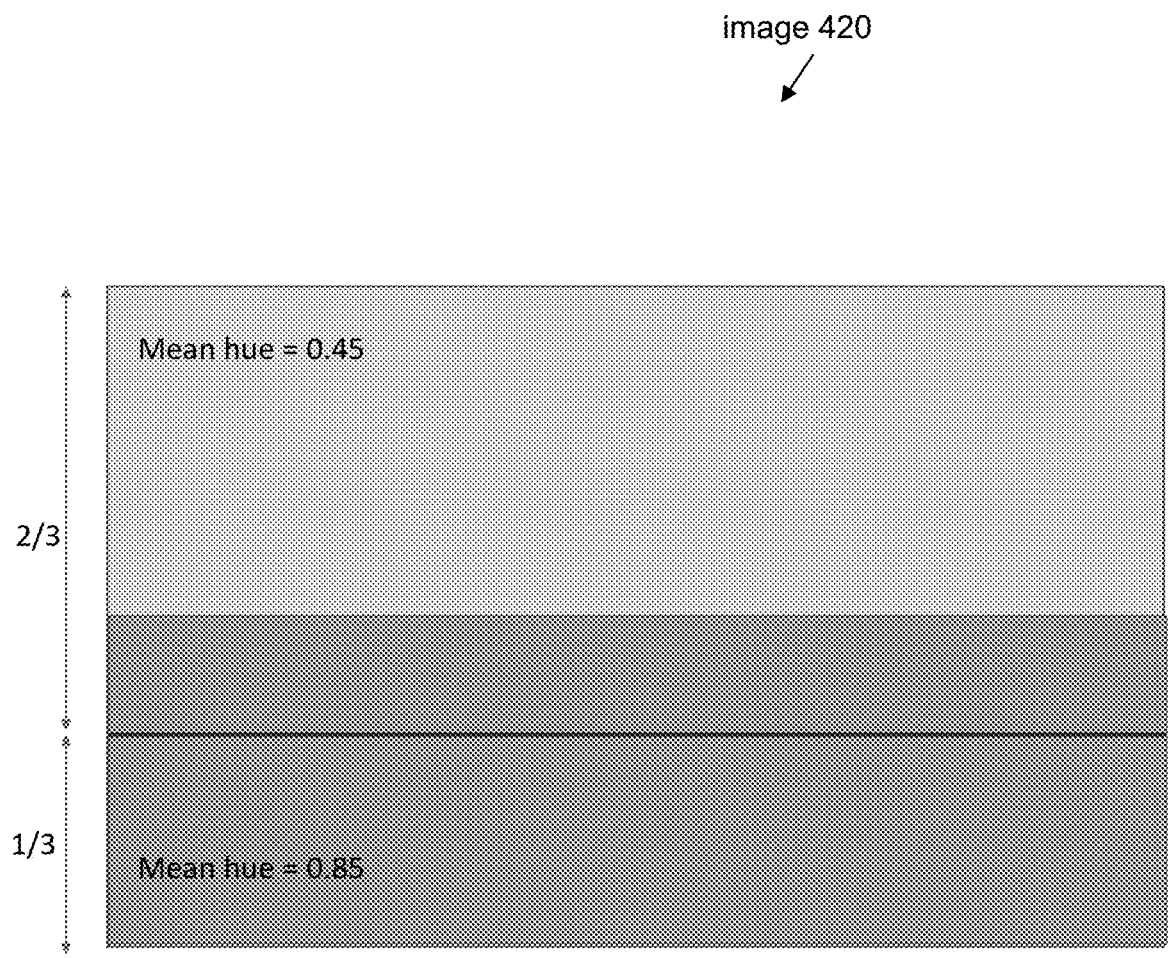

FIG. 4B may show a horizon located at a horizontal line dividing the lower one-half of an image 420 from the upper one-half of the image 420. The image 420 may have a mean hue of 0.45 in the upper two-thirds of the image 420 and a mean hue of 0.85 in the lower one-third of the image 420. The difference of hue means may be 0.40.

Figure 4C:
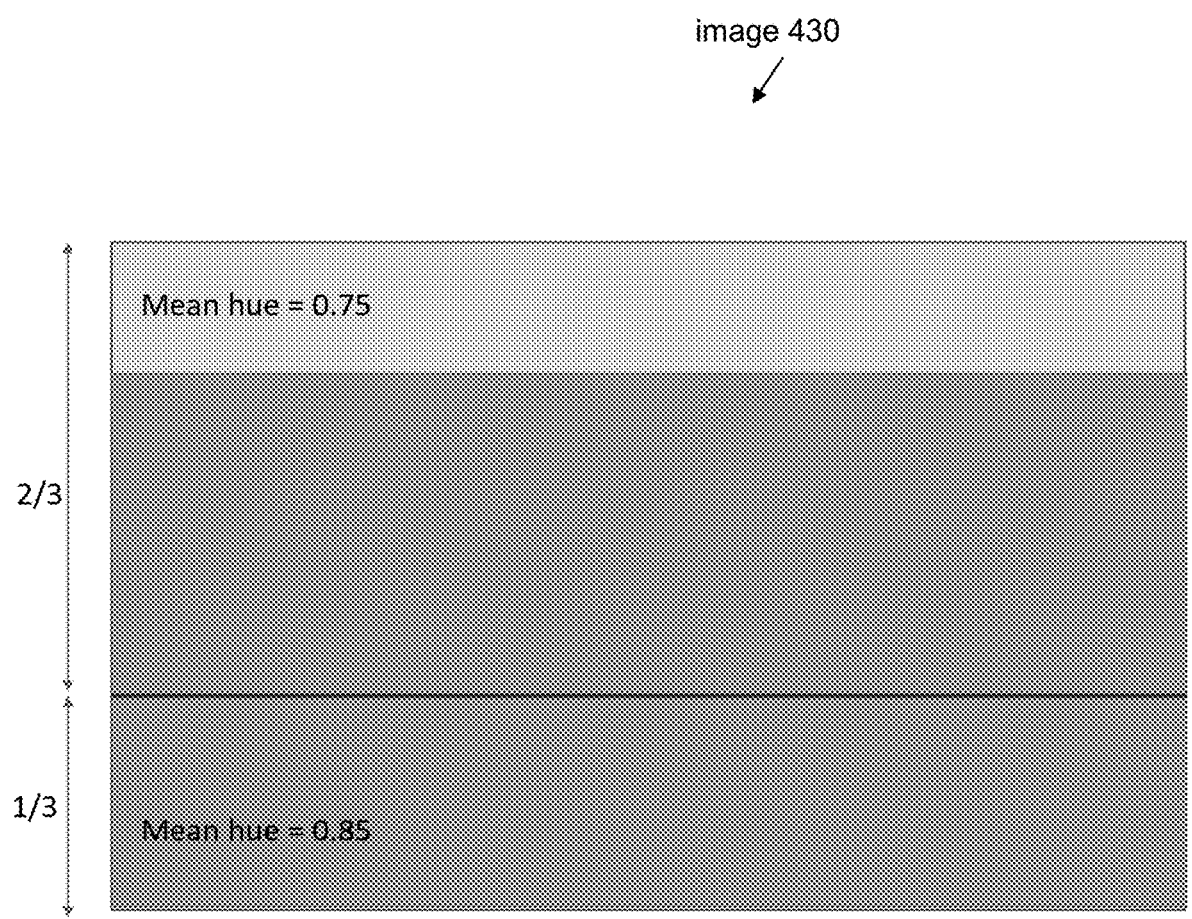

FIG. 4C may show a horizon located near the top of an image 430. The image 430 may have a mean hue of 0.75 in the upper two-thirds of the image 430 and a mean hue of 0.85 in the lower one-third of the image 430. The difference of hue means may be 0.10.

Figure 4D:
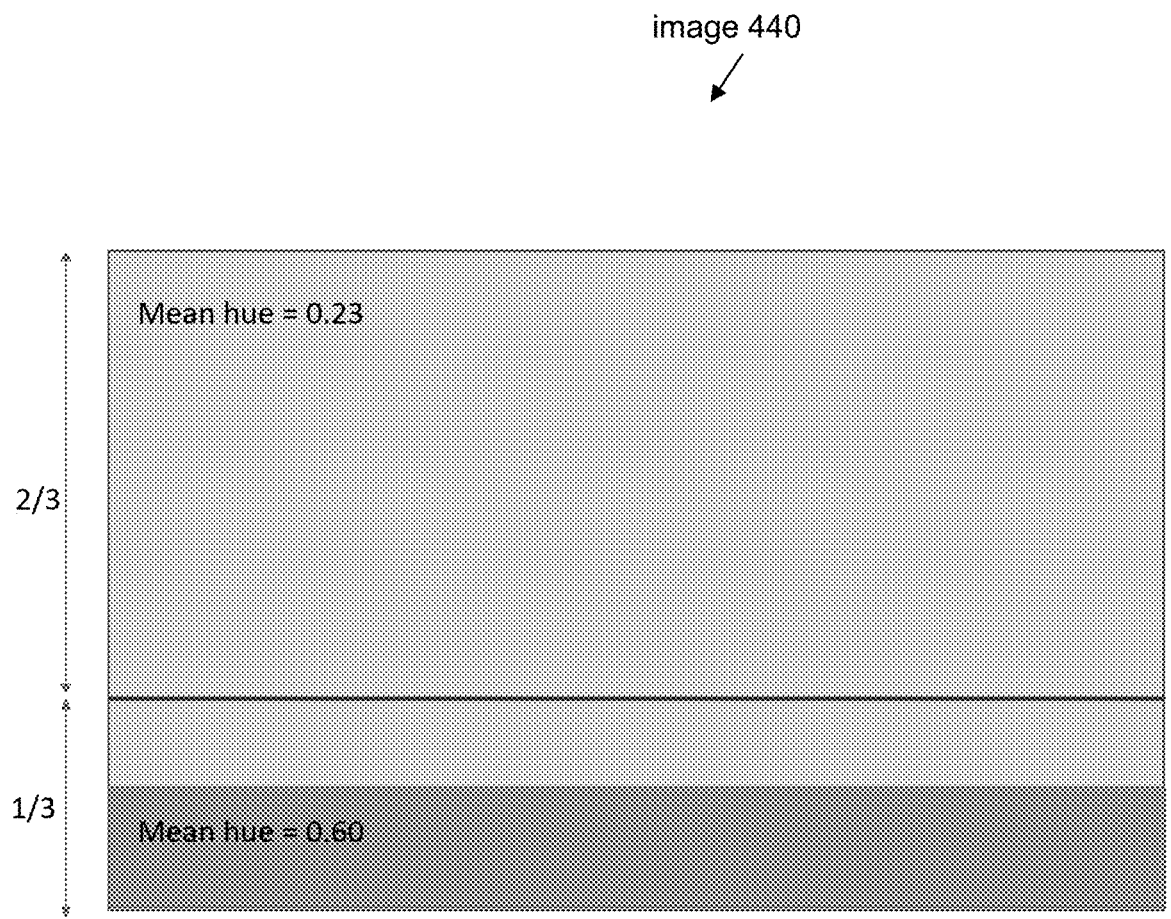

FIG. 4D may show a horizon located near the bottom of an image 440. The image 440 may have a mean hue of 0.23 in the upper two-thirds of the image 440 and a mean hue of 0.60 in the lower one-third of the image 440. The difference of hue means may be 0.37. Thus, the largest difference in mean hue between the lower one-third of the image and the upper two-thirds of the image may be found in the image 410 (FIG. 4A), which respects the rule of thirds.

Figure 5:
FIG. 5 illustrates an example image.

Such analysis of the image, however, may not reliably identify visually pleasant images. For example, such analysis of the image may not properly account for one or more objects on or near the horizon (e.g., object(s) between the ground and the sky). As another example, such analysis of the image may not properly account for optic distortion of the image capture device(s) that captured the image. For example, FIG. 5 illustrates an image 500. The image 500 may have been captured by an image capture device with a wide-field of view, which may result in distortion (curvature) within the image 500. Although the image 500 may respect the rule of thirds, having two-thirds of the image showing the sky may not be visually pleasant.

Rather than relying on one-third and two-thirds segmentation of images, the image may be segmented into thirds for scoring. Such segmentation of images may properly account for the depiction of things below the horizon (e.g., the ground), the depiction of things above the horizon (e.g., the sky), and the depiction of things on or near the horizon (e.g., object(s) between the ground and the sky).

Figure 6:
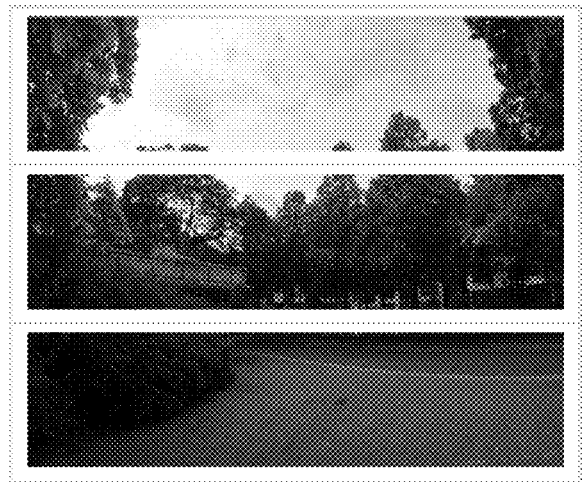
FIG. 6 illustrates example segmentation of images.
Figure 6:
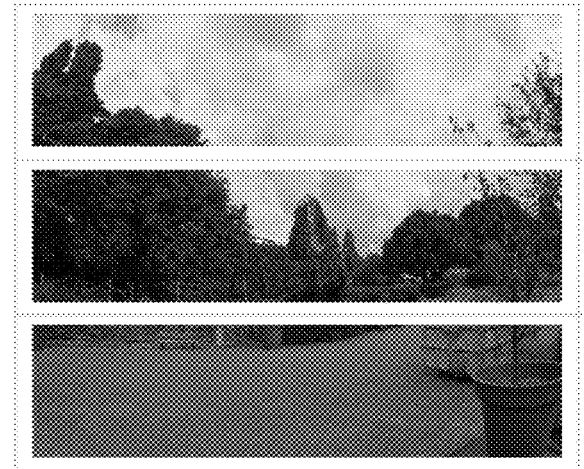

FIG. 6 illustrates example segmentation of images into thirds. As shown in FIG. 6, an image 600 and an image 650 may be segmented into three bands (top band, middle band, bottom band). Analysis of the image using these bands may properly account for the depiction of things below the horizon (e.g., the ground), the depiction of things above the horizon (e.g., the sky), and the depiction of things on or near the horizon (e.g., object(s) between the ground and the sky).

The metric component 106 may be configured to determine a set of color metric values of multiple metrics for individual bands based on the values of the multiple channels of the pixels within the individual bands and/or other information. For example, referring to FIG. 3, a set of color metric values may be determined for the band A 302 based on the values of multiple channels of pixels within the band A 302 and/or other information. A set of color metric values may be determined for the band B 304 based on the values of multiple channels of pixels within the band B 304 and/or other information. And a set of color metric values may be determined for the band C 306 based on the values of multiple channels of pixels within the band C 306 and/or other information.

A set of color metric values may include one or more color metric values. A color metric value may refer to a value determined (e.g., calculated) based on one or more color parameters/characteristics of the pixels within the individual bands. Multiple color metric values may be determined based on multiple metrics. A metric may refer to a one or more standards, systems, and/or factors for measuring pixel parameters/characteristics. A metric may refer to a one or more standards, systems, and/or factors according to which one or more color metric values are determined.

A metric may be used to determine one or multiples of the color metric values. Multiple metrics may be used to determine one or multiples of the color metric values. A metric may be used to characterize one or more color parameters/characteristics of the pixels within the individual bands. The color parameters/characteristics of the pixels may be included within multiple channels, and a metric may be used to characterize one or more color parameters/characteristics of the pixels in one or more channels.

For example, the channels by which colors of pixels are defined may include one or more of a hue channel, a saturation channel, a value channel, a red channel, a green channel, a blue channel, and/or other channels, and the multiple metrics by which a set of color metric values are determined may include metrics that characterize color parameters/characteristics of within one or more of the hue channel (hue metric), the saturation channel (saturation metric), the value channel (value metric), the red channel (red metric), the green channel (green metric), the blue channel (blue metric), and/or other channels.

A value of a color metric value may equal and/or be determined based on value(s) that define the color of the pixels within the corresponding channel(s). For example, a value of a color metric for a band with respect to the hue channel may be determined as and/or based on the values of the hue of pixels within the band, such as based on mean of hue, trimmed mean of hue, sigma mean of hue, and/or median of hue. Mean of hue may refer to the average of hue values of the pixels within the band. Trimmed mean of hue may refer to mean values calculated with removal of a certain amount of the lowest and highest hue values (e.g., removal of lowest 10% and highest 10% hue value). Same or different amounts may be removed from the two ends. Trimmed mean of hue may be determined by discarding a certain amount of the lowest and highest hue values before calculation of the mean value. Sigma mean of hue may refer to mean values calculated using standard deviation of the hue values (e.g., mean with +/−3*sigma of hue). Median of hue may refer to the median hue values of the pixels within the band. The use of one or more of the trimmed mean of hue, sigma mean of hue, and/or median of hue may enable calculation of the color metric values that avoid outliers in the computation of the hue (e.g., colorful objects within the image that modifies the dominant hue may be discarded). The use of one or more of the trimmed mean of hue, sigma mean of hue, and/or median of hue may smooth the color metric value generation. The same or similar metrics may be applied to other channels (e.g., saturation channel, value channel, red channel, green channel, blue channel) for color metric value generation.

In some implementations, a color metric value may be determined using a standard deviation. For example, a color metric value for the hue channel and/or the saturation channel may include a standard deviation value of the corresponding hue/saturation values of pixels within a band.

A hue channel may be circular (e.g., for normalized hue, 0.01 hue value may be similar to 0.99 hue value) and classic mean and standard deviation computation may not be used. The determination (calculation) of the color metric value for the hue channel may be performed using circular mean and circular standard deviation. For circular mean, $h_k$ may denote the hue values over the flattened image/thumbnail, with vector size height×weight. These values may be normalized in [0, 1]. Radian values may be obtained by multiplying by $2\pi$, and then computing the mean (M):

$$M = \arctan2\left(\sum_k \sin(hk), \sum_k \cos(h_k)\right)$$

The mean (M) may be normalized to [0, 1] (divided by $2\pi$). To ensure that the mean value exists in [0, 1], a value of 1.0 may be added to the mean if the mean is below zero (because it is a circular value). Circular standard deviation may be calculated over the radian values:

$$\sqrt{-\log\left(\left(\frac{\sum_k \sin(h_k)}{H \times W}\right)^2 + \left(\frac{\sum_k \cos(h_k)}{H \times W}\right)^2\right)}$$

In some implementations, hue and/or saturation values may be calculated from RGB values. For example, hue and/or saturation mean values may be calculated from RGB mean values. Trimming of values before mean calculation may allow for removal of outlier values within bands/images. However, because hue value may be circular, it may be more difficult to discriminate the outlier values. Thus, rather than directly calculating trimmed mean of hue and/or saturation, trimmed mean of one or more of RGB channels may be calculated, and the trimmed mean of hue and/or saturation may be calculated from the RGB trimmed mean.

The ratio component 108 may be configured to determine a ratio of one or more values of a set of color metric values of one band to one or more values of another set of color metric values of another band. For example, referring to FIG. 3, the ratio component 108 may determine a ratio of one or more values of the set of color metric values of the band B 304 to one or more values of the set of color metric values of the band A 302. The ratio component 108 may determine a ratio of one or more values of the set of color metric values of the band B 304 to one or more values of the set of color metric values of the band C 306. Determination of other ratios are contemplated.

In some implementations, the ratio of the value(s) of different sets of color metric values may be determined as a minimum of different ratios of the standard deviation of color metric value(s). For example, referring to FIG. 3, the ratio may be determined as a minimum of (1) a first ratio of a standard deviation of one or more value of the set of color metric values of the band B 304 to one or more value of the set of color metric values of the band A 302, and (2) a second ratio of a standard deviation of one or more values of the set of color metric values of the band B 304 to one or more values of the set of color metric values of the band C 306.

For example, the ratio may use both hue and saturation channels, and select the more discriminating ratio. For instance, if colors are similar, then saturation may be used to favor high color contrast. For example, the ratio may be computed as following, with "top" corresponding to values of a top band (e.g., the band A 302), "mid" corresponding to values of a middle band (e.g., the band B 304), "bot" corresponding to values of a bottom band (e.g., the band C 306), and a representing the standard deviation of the corresponding channel and band:

$$r = \min\left(\sqrt{\frac{\sigma_{mid}^{hue}\sigma_{mid}^{sat}}{\sigma_{top}^{hue}\sigma_{top}^{sat}}}, \sqrt{\frac{\sigma_{mid}^{hue}\sigma_{mid}^{sat}}{\sigma_{bot}^{hue}\sigma_{bot}^{sat}}}\right)$$

To normalize the values, the ratio (r) may be stretched between two thresholds:

$$r = \frac{\min(\max(r, \tau_{min}), \tau_{max}) - \tau_{min}}{\tau_{max} - \tau_{min}}$$

The score component 110 may be configured to determine a score for the image based on the ratio, one or more comparisons of value(s) of a set of color metric values of one band to value(s) of one or more sets of color metric values of other band(s). For example, referring to FIG. 3, the score component 110 may determine a score for the image 300 based on the ratio of color metric value(s), a first compression of one or more values of the set of color metric values of the band A 302 to one or more values of the set of color metric values of the band C 306, a second comparison of one or more values of the set of color metric values of the band B 304 to one or more values of the set of color metric values of the band A 302 or the band C 306, and/or other information. The score for the image 500 may be determined based on the comparison of color metric value(s) of the band A 302 to the band C 306, and the comparison of color metric value(s) of the band B 304 to the band A 302 or the band C 306.

Figure 7A:
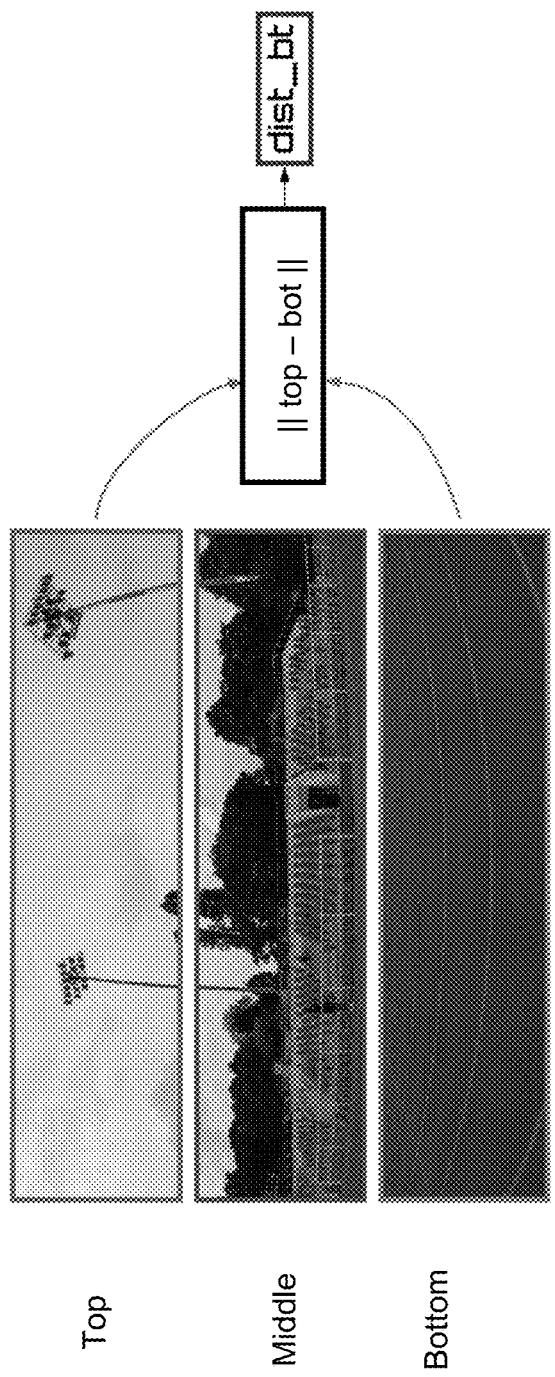
FIGS. 7A-7B illustrate example comparison of color metric values.
Figure 7B:
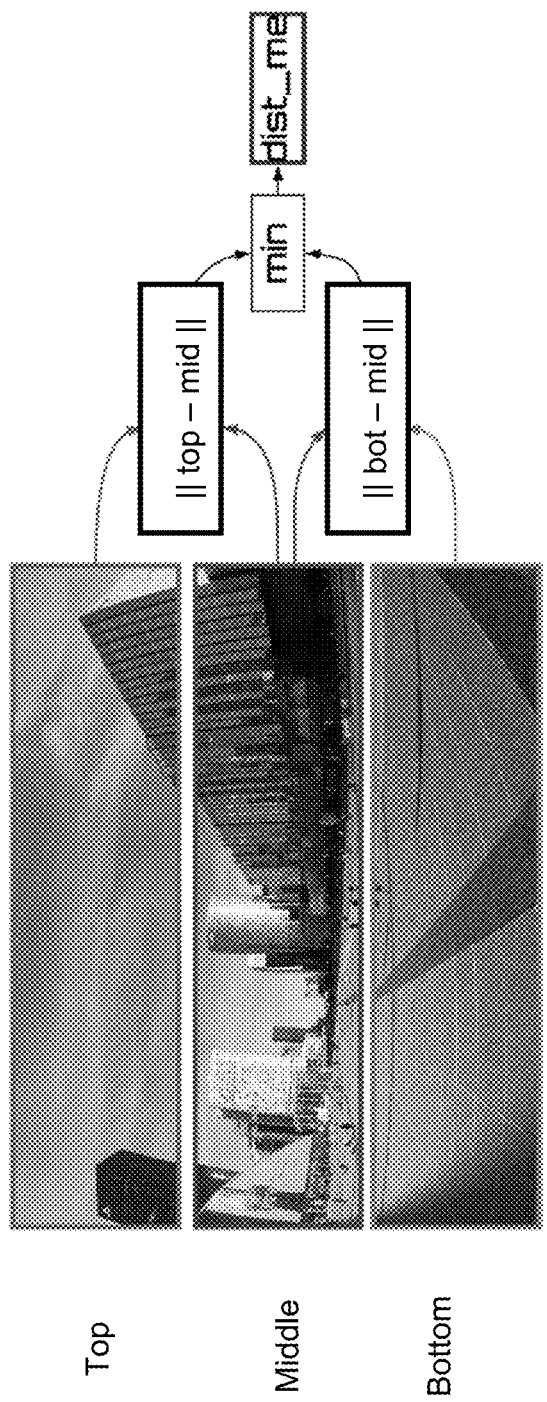

The comparisons may be used to determine the differences in color metric value(s) (distances) between the bands. The distance between the top and bottom bands may be denoted as $\delta_{bt}$ or dist_bt and the distance between the middle band and the top/bottom band may be denoted as $\delta_{me}$ or dist_me. For example, the distance between the top and bottom bands (dist_bt) may be calculated as shown in FIG. 7A, and the distance between the middle band and the top/bottom band (dist_me) may be calculated as shown in FIG. 7B, as minimum of (1) the distance between the middle and top bands and (2) the distance between the middle and bottom bands. Example calculation of distances are provided below. Other distance calculations are contemplated.

The distance between the middle band and the top/bottom band (dist_me) may be reinforced by the saturation contrast. The saturation contrast ($\omega_{me}$) may be the distance in saturation channel, given by the following, where p is a color metric value (e.g., mean, trimmed mean, sigma mean, median) of the corresponding channel and band:

$$\omega_{me} = \min(\|\mu_{top}^{sat} - \mu_{mid}^{sat}\|_1, \|\mu_{mid}^{sat} - \mu_{bot}^{sat}\|_1)$$

The distance between the top and bottom bands ($\epsilon_{bt}$, dist_bt) may be calculated as the following, where $\|_c e$ is the circular distance:

$$\delta_{bt} = \max(\|\mu_{top}^{hue} - \mu_{bot}^{hue}\|_c, \|\mu_{top}^{sat} - \mu_{bot}^{sat}\|_1)$$

The distance between the middle band and the top/bottom band ($\delta_{me}$, dist_me) may be calculated as the following:

$$\delta_m = \max(\min(\|\mu_{top}^{hue} - \mu_{mid}^{hue}\|_c, \|\mu_{mid}^{hue} - \mu_{bot}^{hue}\|_c), \min(\|\mu_{top}^{sat} - \mu_{mid}^{sat}\|_c, \|\mu_{mid}^{sat} - \mu_{bot}^{sat}\|_1))$$

The score for the image may be determined based on the distances between the bands. For example, the score for the image may be determined as a linear interpolation between dist_bt and dist_me. Example calculation of the score (S) may include the following:

$$S = 2(r\delta_{bt} + (1-r)\sqrt{\delta_{me}\omega_{me}})$$

To account for circular distances in [0, ½], the score may be multiplied by 2.0 to keep the score within [0, 1]. The ratio (r) may impact the influence of the distances (dist_bt, dist_me) on the score. For example, if the middle band includes depiction of both ground and sky, or has color from one side (e.g., trees in the middle of over grass on the ground), it may be difficult to separate the middle band from the top/bottom band. Therefore, the difference between the top and bottom bands (dist_bt) may have more impact on the score. If the middle band is uniform or is similar to the top/bottom band, the color distances between the middle band and both the top and bottom bands may be calculated. Other score calculations are contemplated.

In some implementations, the score may characterize inclusion of a depiction of a sky within the top band, inclusion of a depiction of a ground within the bottom band, and inclusion of a depiction of one or more objects between the ground and the sky within the middle band. For example, the value of the score may depend on the extent to which the top band includes a depiction of a sky, the bottom band includes a depiction of a ground, and the middle band includes a depiction of one or more objects (e.g., persons, animal, plant, vehicle, structure, landscape, horizon) between the ground and the sky. For example, the value of the score may be low/minimized if the visual content within the image is uniform. The value of the score may be high/maximized if the visual content within the image is divided/balanced within three bands.

In some implementations, the score may be modified based on a tilt of visual content within the image and/or other information. For example, a tilt of visual content within the image (e.g., due to image being captured with tilted image capture device) may cause the score to be higher, and the score of the image with tiled visual content may be reduced. In some implementations, the image may be modified to remove the tilt of visual content. For example, the image may be rotated to level a horizontal feature within the image (e.g., leveling the depiction of a horizon/horizontal object within the image). The image may be cropped to provide a view with the same aspect ratio as the original, unrotated image.

The score for the image may be associated with the image. For example, the score for the image may be maintained in a database that tracks scores for images. The score for the image may be stored with the image or separately from the image. For example, the score for the image may be stored within a metadata file/track for the image.

One or more images may be presented and/or stored based on the scores. For example, a number of images may be scored and presented on a display based on the score (e.g., presentation of the image with the highest score, presentation of a certain number of top-scoring images, presentation of top-scoring image(s) for differently classified images, such as presentation of the top-scoring image(s) for images taken at a beach, presentation of the top-scoring image(s) for images taken while skiing, and/or presentation of the top-scoring image(s) for images while biking in a forest). A number of images may be scored and stored in one or more storage locations (local storage, remote storage for sharing) based on the score (e.g., storage of the image with the highest score, storage of a certain number of top-scoring images, storage of top-scoring image(s) for differently classified images).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
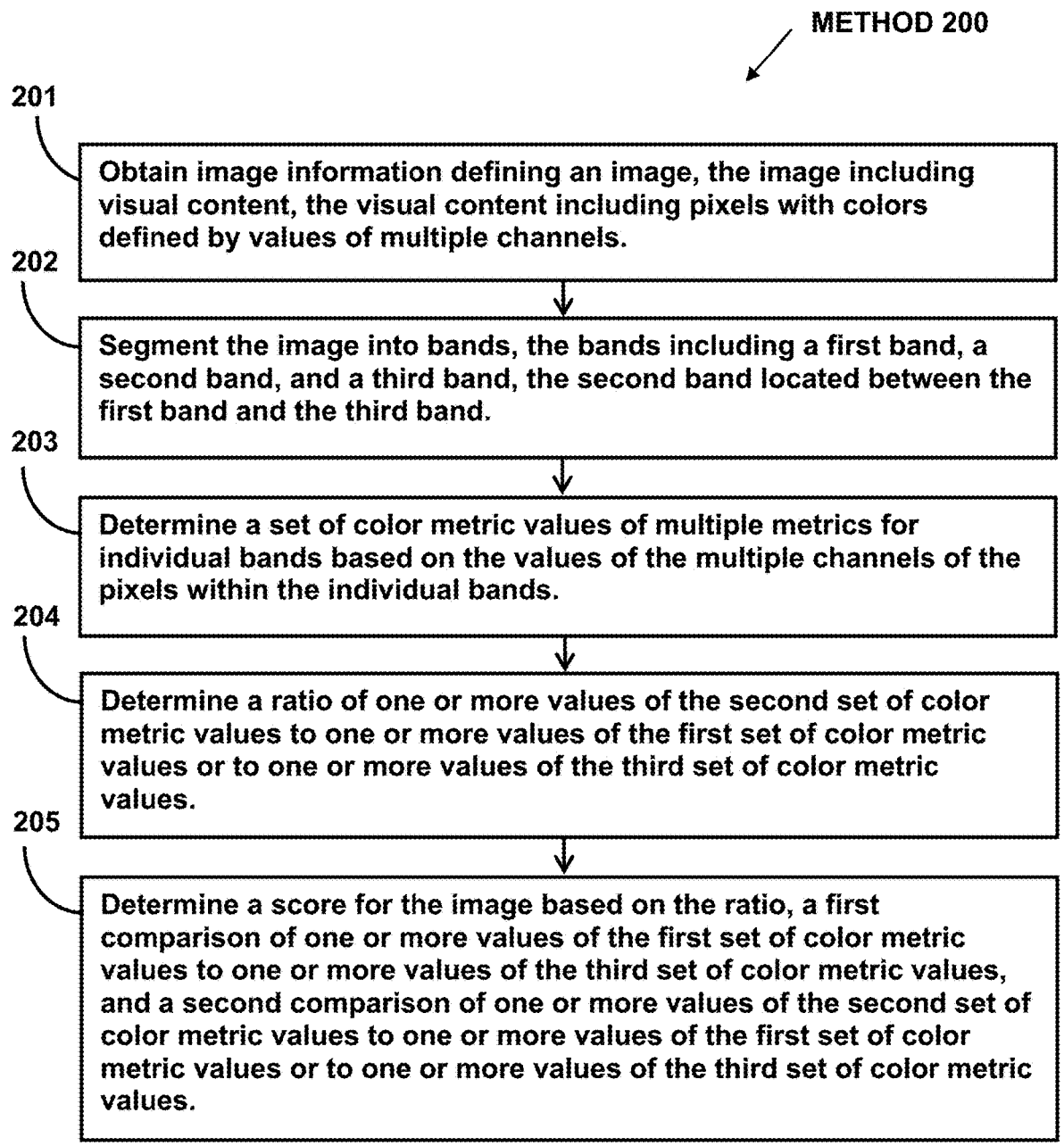
FIG. 2 illustrates a method for scoring images.

FIG. 2 illustrates method 200 for scoring images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, image information defining an image may be obtained. The image may include visual content. The visual content may include pixels with colors defined by values of multiple channels. In some implementation, operation 201 may be performed by a processor component the same as or similar to the image information component 102 (Shown in FIG. 1 and described herein).

At operation 202, the image may be segmented into bands. The bands may include a first band, a second band, and a third band. The second band may be located between the first band and the third band. In some implementations, operation 202 may be performed by a processor component the same as or similar to the segment component 104 (Shown in FIG. 1 and described herein).

At operation 203, a set of color metric values of multiple metrics may be determined for individual bands based on the values of the multiple channels of the pixels within the individual bands. A first set of color metric values may be determined for the first band based on the values of the multiple channels of the pixels within the first band. A second set of color metric values may be determined for the second band based on the values of the multiple channels of the pixels within the second band. A third set of color metric values may be determined for the third band based on the values of the multiple channels of the pixels within the third band. In some implementations, operation 203 may be performed by a processor component the same as or similar to the metric component 106 (Shown in FIG. 1 and described herein).

At operation 204, a ratio of one or more values of the second set of color metric values to one or more values of the first set of color metric values or to one or more values of the third set of color metric values may be determined. In some implementations, operation 204 may be performed by a processor component the same as or similar to the ratio component 108 (Shown in FIG. 1 and described herein).

At operation 205, a score for the image may be determined based on the ratio, a first comparison of one or more values of the first set of color metric values to one or more values of the third set of color metric values, and a second comparison of one or more values of the second set of color metric values to one or more values of the first set of color metric values or to one or more values of the third set of color metric values. In some implementations, operation 205 may be performed by a processor component the same as or similar to the score component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that scores images, the system comprising:
one or more physical processors configured by machine-readable instructions to:
   obtain image information defining an image, the image including visual content, the visual content including pixels with colors defined by values of multiple channels;
   segment the image into bands, the bands including a first band, a second band, and a third band, the second band located between the first band and the third band;
   determine a set of color metric values of multiple metrics for individual bands based on the values of the multiple channels of the pixels within the individual bands such that a first set of color metric values is determined for the first band based on the values of the multiple channels of the pixels within the first band, a second set of color metric values is determined for the second band based on the values of the multiple channels of the pixels within the second band, and a third set of color metric values is determined for the third band based on the values of the multiple channels of the pixels within the third band;
   determine a ratio of one or more values of the second set of color metric values to one or more values of the first set of color metric values or to one or more values of the third set of color metric values; and
   determine a score for the image based on the ratio, a first comparison of one or more values of the first set of color metric values to one or more values of the third set of color metric values, and a second comparison of one or more values of the second set of color metric values to one or more values of the first set of color metric values or to one or more values of the third set of color metric values.

2. The system of claim 1, wherein the multiple channels include a hue channel and a saturation channel.

3. The system of claim 2, wherein the set of color metrics values are determined based on means of trimmed values of one or more of the multiple channels of the pixels within the individual bands.

4. The system of claim 3, wherein the trimmed values are determined based on removal of lowest 10% and highest 10% of the values.

5. The system of claim 4, wherein the ratio of one or more values of the second set of color metric values to one or more values of the first set of color metric values or to one or more values of the third set of color metric values is determined as a minimum of a first ratio of a standard deviation of the one or more values of the second set of color metric values to the one or more values of the first set of color metric values and a second ratio of a standard deviation of the one or more values of the second set of color metric values to the one or more values of the third set of color metric values.

6. The system of claim 1, wherein analysis of the image is performed on a lower-resolution thumbnail of the image.

7. The system of claim 6, wherein one or more of an auto white balance, a color matrix, and/or a tone curve is applied to the lower-resolution thumbnail to accentuate color discrimination within the lower-resolution thumbnail.

8. The system of claim 1, wherein the score is modified based on a tilt of visual content within the image.

9. The system of claim 8, wherein the first band is a top band, the second band is a middle band, and the third band is a bottom band.

10. The system of claim 9, wherein the score characterizes inclusion of a depiction of a sky within the top band, inclusion of a depiction of a ground within the bottom band, and inclusion of a depiction of one or more objects between the ground and the sky within the middle band.

11. A method for scoring images, the method performing by a computing system including one or more processors, the method comprising:
   obtaining, by the computing system, image information defining an image, the image including visual content, the visual content including pixels with colors defined by values of multiple channels;
   segmenting, by the computing system, the image into bands, the bands including a first band, a second band, and a third band, the second band located between the first band and the third band;
   determining, by the computing system, a set of color metric values of multiple metrics for individual bands based on the values of the multiple channels of the pixels within the individual bands such that a first set of color metric values is determined for the first band based on the values of the multiple channels of the pixels within the first band, a second set of color metric values is determined for the second band based on the values of the multiple channels of the pixels within the second band, and a third set of color metric values is determined for the third band based on the values of the multiple channels of the pixels within the third band;
   determining, by the computing system, a ratio of one or more values of the second set of color metric values to one or more values of the first set of color metric values or to one or more values of the third set of color metric values; and
   determining, by the computing system, a score for the image based on the ratio, a first comparison of one or more values of the first set of color metric values to one or more values of the third set of color metric values, and a second comparison of one or more values of the second set of color metric values to one or more values of the first set of color metric values or to one or more values of the third set of color metric values.

12. The method of claim 11, wherein the multiple channels include a hue channel and a saturation channel.

13. The method of claim 12, wherein the set of color metrics values are determined based on means of trimmed values of one or more of the multiple channels of the pixels within the individual bands.

14. The method of claim 13, wherein the trimmed values are determined based on removal of lowest 10% and highest 10% of the values.

15. The method of claim 14, wherein the ratio of one or more values of the second set of color metric values to one or more values of the first set of color metric values or to one or more values of the third set of color metric values is determined as a minimum of a first ratio of a standard deviation of the one or more values of the second set of color metric values to the one or more values of the first set of color metric values and a second ratio of a standard deviation of the one or more values of the second set of color metric values to the one or more values of the third set of color metric values.

16. The method of claim 11, wherein analysis of the image is performed on a lower-resolution thumbnail of the image.

17. The method of claim 16, wherein one or more of an auto white balance, a color matrix, and/or a tone curve is applied to the lower-resolution thumbnail to accentuate color discrimination within the lower-resolution thumbnail.

18. The method of claim 11, wherein the score is modified based on a tilt of visual content within the image.

19. The method of claim 18, wherein the first band is a top band, the second band is a middle band, and the third band is a bottom band.

20. The method of claim 19, wherein the score characterizes inclusion of a depiction of a sky within the top band, inclusion of a depiction of a ground within the bottom band, and inclusion of a depiction of one or more objects between the ground and the sky within the middle band.

\* \* \* \* \*